United States Patent Office 3,294,809
Patented Dec. 27, 1966

3,294,809
METHOD OF PREPARING 6-ACYLATED DERIVATIVES OF 1,2,3,4-TETRAHYDRO-1-OXO-β-CARBOLINE
John Shavel, Jr., Mendham, N.J., assignor to Warner-Lambert Pharmaceutical Company, Morris Plains, N.J., a corporation of Delaware
No Drawing. Filed Sept. 24, 1964, Ser. No. 399,104
3 Claims. (Cl. 260—296)

This application is a continuation-in-part of application Serial No. 119,831, filed June 27, 1961 and now Patent No. 3,182,071.

This invention relates to a new and novel method of preparing compounds of the formula

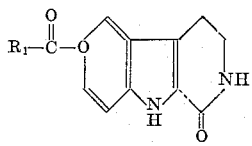

wherein $R_1$ is lower alkyl such as methyl, ethyl, isopropyl, isobutyl, n-butyl and the like.

Heretofore, it has been suggested by Buu-Hoi et al., Chem. Abs., vol. 42, pages 5014–6 (1948), that an acyl group, among others, may be substituted at both the 3- and the 6- positions on a carbazole structure in which two aromatic rings are joined by an inner nitrogen bridge. Since these carbazole structures are symmetrical about an inner nitrogen bridge, it is not surprising that acyl substitution results at both the 3- and at the 6-positions.

When considering the complex structures of compounds such as carbazoles, it may be realized that upon unbalancing the basic symmetrical structure of a carbazole compound by substitution such as, for example, at the inner nitrogen bridge as taught by Plant, Rogers, and Williams in J. Chem. Soc. 741 (1935) with an acyl group, results in a significant shift of the internal ionic influences such that acylation of the substituted carbazole structure results in a product containing a substituted acyl group at the 2- or 7-position. However, by relying on the teaching of Buu-Hoi et al., it would be predicted that substitution in the Plant et al. compound would take place at the 3,6-positions. The unexpected substitution in the Plant et al. compound may be explained as resulting from a change of ionic influences within the carbazole structure by addition of an electronic withdrawing group at the nitrogen bridge.

By analogy, having only the above teachings, it may be predicted that the presence on a 1-oxo-β-carboline structure of the nitrogen-oxygen configuration, also recognized as an electronic withdrawing configuration, would cause substitution to occur at the 6-position due to the shift of ionic influences away from the 6-position and to the nitrogen-oxygen configuration. Substitution would, therefore, logically result at the 7-position on such a carboline structure.

It has now been unexpectedly found, however, that by the method of the present invention, compounds such as 1,2,3,4-tetrahydro-1-oxo-β-carboline may be substituted by an acyl group at the 6-position to produce 6-acylated derivatives of 1,2,3,4-tetra-1-oxo-β-carboline.

The unexpected substitution at the 6-position on 1,2,3,4-tetrahydro-1-oxo-β-carboline, a compound described in German Patent 1,082,598, results by treatment with an acyl halide of the formula

where X is halogen, or an acid anhydride of the formula

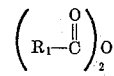

in the presence of a Friedel-Crafts catalyst results in the substitution of an

radical at the 6-position of the starting material.

Useful Friedel-Crafts catalysts include aluminum chloride, aluminum bromide, stannic chloride, ferric chloride, ferric bromide, hydrofluoric acid, polyphosphoric acid, titanium tetrachloride, sulfuric acid and the like.

The reaction is carried out at temperatures between about 0° C. and about 30° C. in the presence of an inert solvent such as nitrobenzene, carbon disulfide, and the like. Nitrobenzene is a particularly useful solvent. After completion of the reaction, the solvent is removed by distillation and the residue is mixed with ice and dilute mineral acid. The solids are recovered and purified by crystallization.

The following Example is included in order further to illustrate the invention:

*Example.—6-acetyl-1,2,3,4-tetrahydro-1-oxo-β-carboline*

To a stirred mixture of 2.02 g. of aluminum chloride and 1.0 ml. of acetyl chloride in 25 ml. of nitrobenzene are added 968 mg. of 1,2,3,4-tetrahydro-1-oxo-β-carboline. After three hours, 100 ml. of water and 50 ml. of ether are added. The solids collect at the interphase. The ether layer is decanted off and the solids filtered, washed with water and ether, and dried for one hour at 110° C. in vacuo. Yield of 6-acetyl-1,2,3,4-tetrahydro-1-oxo-β-carboline: 655 mg. (52%), M.P. 373–4° C.

*Analysis.*—Calcd: C, 68.40; H, 5.30; N, 12.27. Found: C, 68.35; H, 5.33; N, 12.08.

Compounds of the type prepared by the method of the present invention are found to be valuable chemical intermediates and are disclosed in U.S. pat. appln. Serial No. 119,831, filed June 27, 1961 by John Shavel, Jr., Maximilian von Strandtmann and Marvin P. Cohen entitled "Acylated Indole Derivatives" and of which this invention is a continuation-in-part.

As used throughout the specification and in the claims, the term "lower alkyl" refers to straight and branched chain aliphatic groups containing 1 to 6 carbon atoms.

It is understood that the foregoing detailed description is given merely by way of illustration and that many variations may be made therein without departing from the spirit of my invention.

I claim:
1. A method of preparing compounds of the formula:

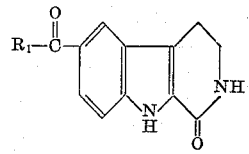

wherein $R_1$ is lower alkyl, which comprises treating a solution of 1,2,3,4-tetrahydro-1-oxo-β-carboline in an inert solvent with a member selected from the group consisting of an acyl halide of the formula

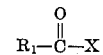

where X is halogen and an acid anhydride of the formula

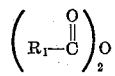

in the presence of a Friedel-Crafts catalyst at a temperature between about 0° C. and about 30° C.

2. A method according to claim 1 wherein said inert solvent is nitrobenzene and said Friedel-Crafts catalyst is aluminum chloride.

3. A method of preparing 6-acetyl-1,2,3,4-tetrahydro-1-oxo-β-carboline which comprises treating a solution of 1,2,3,4-tetrahydro-1-oxo-β-carboline in nitrobenzene with acetyl chloride in the presence of aluminum chloride at a temperature between about 0° C. and about 30° C.

References Cited by the Examiner

FOREIGN PATENTS 1,082,598  11/1960  Germany.

OTHER REFERENCES

Buu-Hoi et al.: Chem. Abstracts, vol. 42, par. 5014–6 (1948).

Shavel et al.: J. Am. Chem. Soc. vol. 84, pp. 881–2 (1962).

WALTER A. MODANCE, *Primary Examiner.*

A. L. ROTMAN, *Assistant Examiner.*